July 21, 1959 F. SCHWARZER 2,896,096

POWER SUPPLY

Filed March 16, 1954 2 Sheets-Sheet 1

INVENTOR.

FRITZ SCHWARZER

BY

July 21, 1959 F. SCHWARZER 2,896,096
POWER SUPPLY
Filed March 16, 1954 2 Sheets-Sheet 2

INVENTOR.
FRITZ SCHWARZER
BY
[signature]

United States Patent Office 2,896,096
Patented July 21, 1959

2,896,096

POWER SUPPLY

Fritz Schwarzer, Munich-Pasing, Germany

Application March 16, 1954, Serial No. 416,641
Claims priority, application Germany March 17, 1953
7 Claims. (Cl. 307—150)

The present invention relates to an improved differential amplifier arrangement and more particularly to a differential amplifier arrangement the input terminals of which must be isolated from ground.

There are many types of amplifier arrangements known in the prior art which are directly supplied from an alternating current power line. In such amplifier, alternating current hum must be eliminated and the effect of fluctuating power line voltages must be compensated for. These problems are of special importance in amplifiers which are highly sensitive and which for one reason or another cannot be grounded. For example, the problem of voltage hum and voltage fluctuation must be overcome if accurate results are to be obtained when the amplifier is part of a vacuum tube volt meter or of an electrocardiograph or an electroencephalograph.

In order to improve the operation of amplifiers of the type described above, it is necessary to include in the amplifier power supply means for elimination of the alternating current hum and means for eliminating the effect of power supply voltage variations and it is also necessary to improve the design of the amplifying stage itself. It is only by the combination described above that overall improved operation of the amplifier will result.

It is an object of the present invention to provide an amplifier arrangement which is free of hum and voltage fluctuations.

It is a further object of the present invention to provide a power supply of the type having a floating secondary winding means and which is free of hum.

It is another object of the present invention to provide a power supply which has direct current output of constant voltage regardless of fluctuations in the alternating current supplied to the primary thereof.

It is still another object of the invention to provide an amplifier the input terminals of which are not grounded and which requires but a single input stage.

It is yet another object of the present invention to provide an amplifier stage especially suitable for use with high sensitivity medical apparatuses.

In accordance with the invention there is provided a power supply arrangement including a power transformer having a primary winding, a core and at least one secondary winding. Shield means enclose the primary winding and a conductive means connects the primary winding and the shield means to a point of reference potential. A second shield means is provided which encloses the secondary winding and which is isolated from the point of reference potential and a conductive connection is made between the secondary winding and the shield means connecting the same. The effect of the connection to the shield means is to eliminate alternating current hum from the rectifier output and therefore no elaborate means are required in succeeding stages for the same purpose.

In a preferred embodiment of the invention the connection between the secondary winding and its shield is made from the center point of the secondary winding.

In accordance with the invention there is also provided a simple means for eliminating the effect of voltage fluctuation in the supply to the primary winding of the power transformer. This comprises a voltage divider consisting of a resistor in series with a glow tube stabilizing device, the divided being connected across a source of alternating current. The primary winding of the transformer is connected in parallel with the glow tube stabilizing device and a rectifier is connected to the secondary winding of the power transformer. The effect of the voltage divider arrangement is to limit the peaks of the voltage applied to the primary winding of the transformer. Such limiting prevents the peak voltage fluctuations present in the alternating current line from affecting the transformer output voltage. In a preferred embodiment, the rectifier output includes a storage capacitor of large size so that a smooth direct current output at the peak value of the rectifier results.

In a preferred embodiment of the invention one of the power supplies described above or their combination drives high sensitivity amplifier. The amplifier may include a single electron discharge device as the input stage thereof this discharge device having a cathode, control grid and anode. The cathode is isolated from ground by a resistance element of high value. The voltage output of the power supply described above is applied across the anode and cathode of the discharge device. As already mentioned, the secondary winding of the power transformer as well as the shield for the secondary winding are isolated from ground. This first stage is coupled by means of resistor-capacitance coupling to a second amplification stage comprising an electron discharge device having a grid leak resistor which is connected back to the cathode of the first stage. This type of arrangement prevents feedback from the second stage to the first stage and also the cathode of the first stage remains isolated from ground. Because of the characteristics of the power supply and the amplifier stages, high amplification is made possible without danger of hum or voltage fluctuation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the drawing, like reference numerals refer to like elements.

Figure 1:
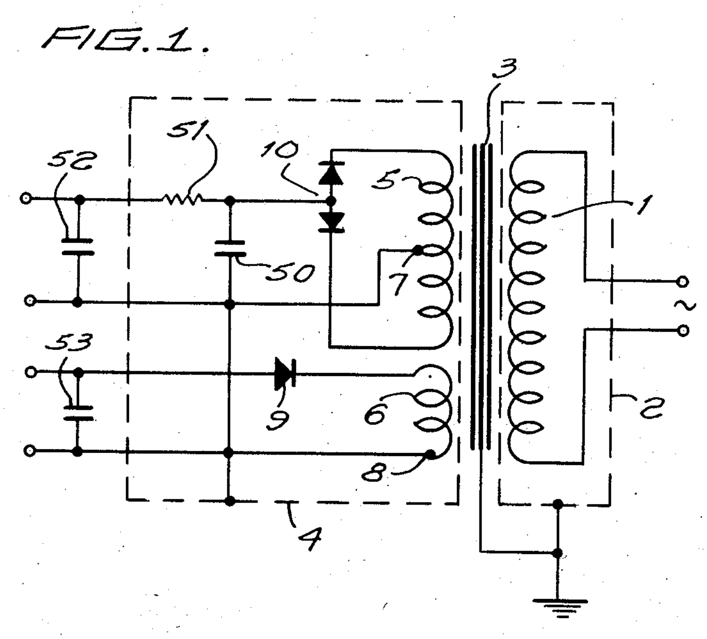
Fig. 1 is a schematic diagram of a power supply in accordance with the invention which includes means for elimination of hum.

Referring now to the drawing and more particularly to Fig. 1 there is shown a power supply including a power transformer having a primary winding 1, core 3, and secondary windings 5, 6. The primary winding is enclosed in a shield 2 and the latter and the core 3 are connected to ground. The secondary windings are also enclosed in a shield, however, the shield is isolated from ground. In order to show the operation of the invention for different types of rectifier arrangements, the high voltage rectifier 10 is shown as a full wave rectifier and the filament current rectifier 9 as a half wave rectifier. In order to filter the high voltage there is provided a capacitive input filter arrangement comprising capacitors 50 and 52 and resistor 51 and similarly a filter comprising capacitor 53 for the filament current. The center point 7 of the high voltage secondary winding and one end 8 of the low voltage secondary winding are connected to the shield 4.

The connection of the secondary transformer winding to the secondary shield has been found greatly to improve the performance of the rectifier. It has been discovered that much of the hum in the transformer output is caused by the capacity of the secondary winding to ground which cannot be eliminated since in the contemplated applications of the power supply the secondary winding cannot be grounded. It has been found that the connection of the secondary windings to the shield enclosing the secondary winding eliminates the disturbing hum.

In prior art devices of the type described above, for example, power supplies for high sensitivity amplifiers which for one reason or another cannot be grounded (such as vacuum tube voltmeters the probes of which are sometimes used to measure between two voltage points, both of which are removed from ground, and electromedical instruments), the interfering voltages cannot be eliminated by grounding the secondary winding. Therefore up till the present time such instruments have required elaborate means in the stages following the power stage in order to eliminate alternating current hum.

Figure 2:
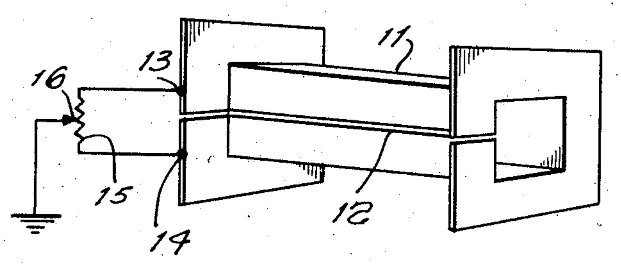
Fig. 2 is a perspective and partial schematic view of a shield which may be used in the arrangement shown in Fig. 1.

Referring now to Fig. 2, there is shown an additional method for elimination of alternating current hum. This is required in addition to the means provided in the arrangement of Fig. 1 when the power supply is used in connection with extremely high sensitivity amplifier stages. As in Fig. 1, the secondary windings of the power transformer are encased in a shield 11 shown in part in Fig. 2. So that the shield does not short circuit the secondary winding, it is provided with a slot 12. One can then consider the shield itself to be a single winding and across the slot 12 there develops a small value of potential difference. In accordance with the invention, this can be eliminated from the winding if the points 13, 14 on opposite sides of the slot are connected to a point of null potential such as, for example the center point of one of the secondary windings. In an improved embodiment, the points 13, 14 are connected to the fixed contacts of a potentiometer 15 the movable contact of which is connected to a null potential point.

Figure 3:
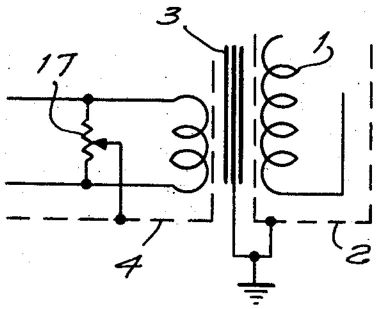
Fig. 3 is a schematic diagram of another embodiment of the invention shown in Fig. 1.

Fig. 3 illustrates a portion of a power transformer having a secondary winding which supplies alternating current to a filament of an amplifier tube. In order to eliminate hum, a potentiometer 17 is connected across the secondary winding and the center point of the potentiometer connected to the shield 4. The fact that the center tap is movable enables one to compensate for any possible unbalance in the secondary winding.

Figure 4:
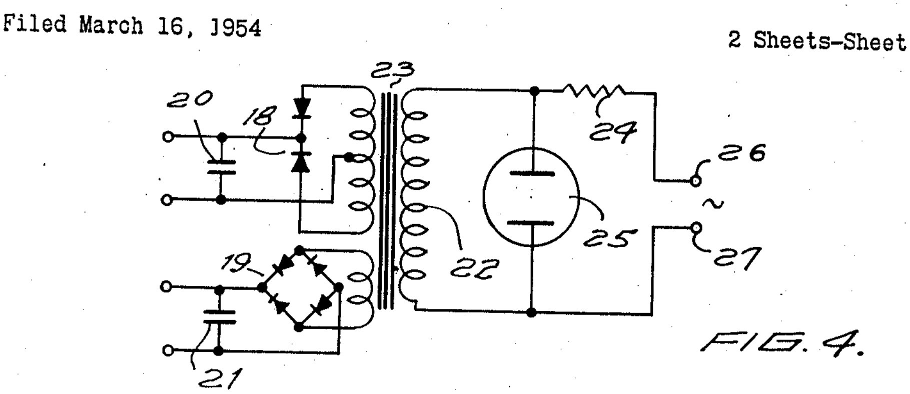
Fig. 4 is a schematic diagram of a power supply in accordance with the invention which includes means for stabilizing the direct current output thereof.
Figure 5:
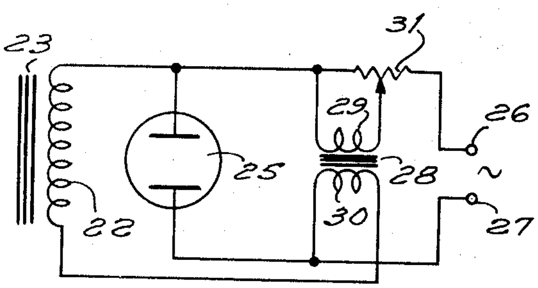
Fig. 5 is a schematic drawing of a power supply in accordance with the invention including another means for stabilizing the direct current output thereof.

Figs. 4 and 5 illustrate power supply arrangements which include means for maintaining the direct current output of the power supply at a constant level.

There are many means known in the prior art for stabilizing direct current voltages. For example, there have been used iron-hydrogen resistance elements, glow discharge stabilizers and various tube circuits. All of these arrangements have certain disadvantages. The iron-hydrogen resistance method for stabilizing voltages has the disadvantage that the iron-hydrogen element is not sturdy and also its life expectancy is poor and depends upon the amount of current rectified. Glow discharge devices, although quite efficient are usable only for voltages in about the 70 volt to the 300 volt range and separate types of glow discharge devices must be used for separate voltage values. For example, if a direct voltage of 90 volts is desired, a so-called VR 90 tube must be used and if it is desired to regulate at some other value of voltage another type of voltage regulating gas tube must be used. One cannot take one glow tube and use it for any voltage it is desired to regulate nor are glow tubes usable to regulate low values of direct voltage. Tube circuits are disadvantageous because they are expensive and also because different tubes even though the same type have different characteristics and must be separately adjusted.

In accordance with the invention, a glow discharge device is employed to regulate the direct voltage and the voltage to be regulated is independent of the igniting potential or extinguishing potential of the glow discharge device. The glow discharge device may be used advantageously to regulate at the same time both the anode potential and the filament current supply of a high sensitivity amplifier. Using an arrangement such as described, it is possible to do without numerous filter stages and still to obtain steady direct currents at, or close to, the peak value of the secondary transformer output.

Referring now to Fig. 4, there is shown a power supply for driving a high sensitivity amplifier. In this circuit, full wave rectifier 18 is designed to provide a high voltage such as, for example, 500 volts for the amplifier B plus supply and bridge rectifier 19 is designed to provide the low voltage such as 6.3 volts for the amplifier filament. Rectifiers 18 and 19 feed their outputs to charging condensers 20 and 21 respectively. These condensers are of large size and are always charged to the peak value of the pulsating direct current output of the respective secondary windings of the power transformer 23. The primary circuit of the power transformer 23 comprises primary winding 22, resistor 24 and a glow tube stabilization device 25 of the cold cathode type. The resistor 24 and glow tube stabilization device 25 are connected in series to terminals 26 and 27 which are adapted to be connected to a source of alternating voltage. Elements 24 and 25 form a voltage divider and when the values of each are properly chosen, in spite of fluctuations in the root mean square value of the power source normally connected to terminals 26, 27, the peak value of the voltage applied to the primary winding 22 of the transformer 23 remains the same. Since the peaks of the alternating voltage supplied to the primary winding 22 have a constant value, the voltages developed across the secondary windings also attain a constant peak value. Accordingly, as already explained, the output of storage capacitors 20 and 21 is constant and is approximately equal to the peak value of the pulsating direct current at the output of the respective rectifiers to which they are connected. Of course, depending upon the variations in the load driven by the rectifiers 18, 19 there will be some minor fluctuation in the direct current output. However, means will be described below for eliminating even this minor amount of fluctuation.

Summarizing briefly the operation of the embodiment of the invention illustrated in Fig. 4, we have seen that it is possible to stabilize both high values and low values of direct current using any given type of glow discharge stabilization device. In the example above, voltages of 6.3 volts and of 500 volts were stabilized simultaneously using only a single glow discharge device, the igniting and extinguishing voltages of which are independent of the value of direct voltage output. If the device should be adapted also for direct current the transformer is omitted and the rectifying device is connected directly.

Fig. 5 illustrates an embodiment of the invention which gives even more accurate voltage stabilization than the embodiment of Fig. 4. The secondary portion of the transformer arrangement is identical with that illustrated in Fig. 4 and therefore is not shown in Fig. 5. The input terminals 26, 27 are connected across the voltage divider comprising potentiometer 31 and glow discharge device stabilizer 25. In addition, there is provided a transformer 28 the primary winding 29 of which is connected between the movable contact of potentiometer 31 and the end of potentiometer 31 connected to one of the electrodes of element 25. The secondary winding 30 of transformer 28 is connected in series between the other electrode of glow discharge device 25 and the primary winding 22 of the transformer 23. The voltage present in secondary winding 30 is 180° out of phase with the voltage applied to the primary winding 29. This arrangement provides, when potentiometer 31 is properly adjusted, a very stable direct current even when there are relatively large fluctuations in the peak value of the applied alternating voltage.

Although not illustrated, it is to be understood that a feedback arrangement similar to that described above in the primary winding circuit can be inserted in the secondary winding circuit in order to compensate for the small changes in the direct current output of the secondary circuit.

It is to be understood that any of the arrangements described in Figs. 1–3 may be combined with any of the arrangements described in Figs. 4 and 5. Thus, for example, it is possible to have an amplifier arrangement including a power supply as shown in Fig. 1 across the primary winding of which is located the voltage divider arrangement 24, 25 as illustrated in Fig. 4 or the voltage divider arrangement 31, 35 and transformer arrangement 28 as illustrated in Fig. 5. According to the characteristics of the amplifier tube employed, the high voltage anode supply may be a full wave arrangement such as illustrated in Fig. 1 or a bridge circuit arrangement (shown as the low voltage rectifier in Fig. 4). Similarly, the filament supply rectifier may comprise a half-wave rectifier arrangement as shown in Fig. 1 or a bridge circuit arrangement, or, in certain tubes where alternating voltage is used, an arrangement as shown in Fig. 3.

Figure 6:
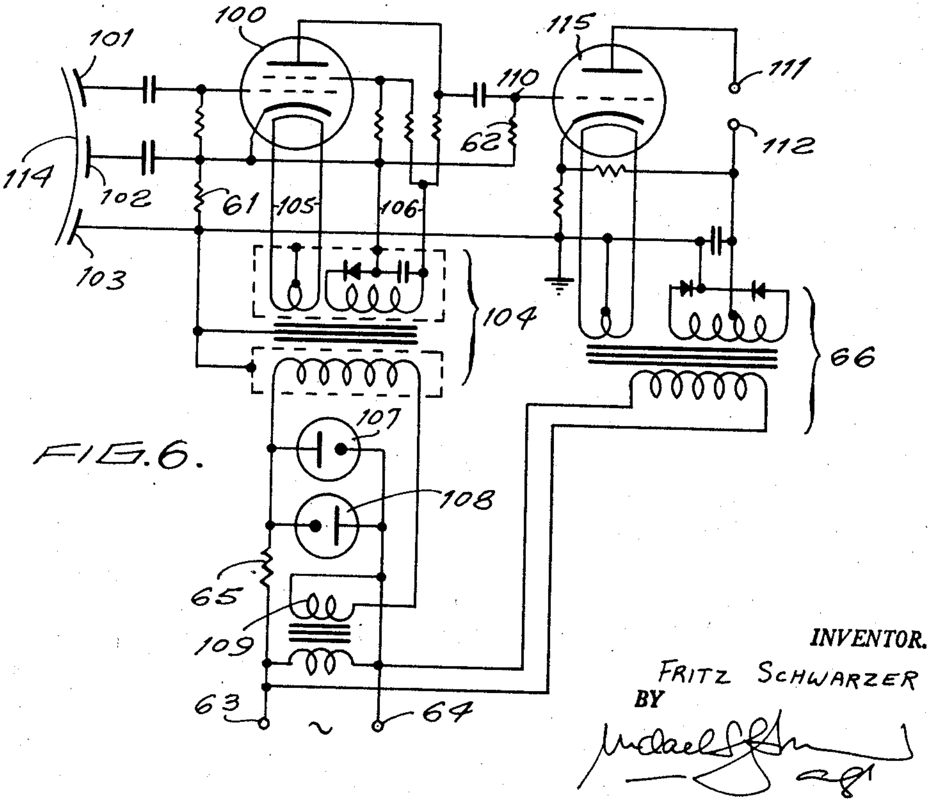
Fig. 6 is a schematic diagram of an amplifier arrangement including both amplifier and power supply sections, all in accordance with the inventon.

Figure 6 illustrates one arrangement of the type described above. The amplifier comprises a tetrode 100 the cathode of which is isolated from ground by high value of resistance 61. Electrodes 101 and 102 which are conductively secured to the body 114 are coupled between the control grid and cathode of tube 100. Electrode 103 is grounded. Power supply 104 includes a shielded primary winding and shielded secondary winding. The anode voltage is applied across leads 106 and the alterating filament voltage applied across leads 105. As can be seen, the secondary transformer windings are connected to the shield of the secondary windings in order that alternating current hum may be eliminated in the manner already described in connection with Figs. 1–3. The input alternating current voltage is applied across terminals 63, 64 and thence through a resistor 65 to the pair of voltage regulator gas tubes 107, 108 which are connected in opposition. A feedback transformer arrangement 109 is also provided in order to compensate for minor voltage fluctuations not eliminated by the voltage divider 64, 107, 108.

The above arrangement of voltage divider tubes is slightly different than the arrangement of the glow discharge stabilizer device illustrated in Figs. 4 and 5 however its manner of operation is quite similar. As is well known, the difference between the voltage regulator gas tubes and cold cathode discharge devices is that the former are unidirectional whereas the latter are bidirectional. Accordingly, when gas voltage regulator tubes (hot cathode) are employed, they must be oppositely connected so that one tube can compensate for positive voltage peaks and the other for negative voltage peaks. A second power supply 66 is also connected to the input terminals 63, 64 in order to provide operating voltages for the second stage 115 of the amplifier. The amplifier output is obtained at terminals 111, 112. These terminals are adapted to supply an output signal to an indicating device such as a cathode ray oscilloscope or, in the case of an electrocardiogram, to a direct writing instrument or to any other indicating device well known in the art.

In operation, the embodiment of the invention illustrated in Fig. 6 works on principles similar to those already outlined in connection with the preceding five figures. The resistor 61 which is of a high value isolates amplifier 100 from ground. The power supply secondary winding and its shield is also isolated from ground. The power supply includes means therein which have already been explained for the elimination of alternating current hum and other spurious interference signals of small amplitude and the primary side of the power supply includes gas tubes for regulating the input voltage to the transformer so that fluctuations in the peak voltage available at the main alternating voltage source will have no effect whatsoever on the direct voltage output circuit to the anode of the amplifier and the alternating voltage fed to the filament of the amplifier. Amplifier 100 is resistor-condenser coupled to the second amplifier stage 115 and the grid leak resistor 62 which is connected to point 110 at the control grid of the second amplifier is connected directly to the cathode of the first amplifier stage. For reasons already given, because of this type of connection there is no harmful feed-back voltage developed and the amplification characteristics of the first stage thereby remain unaffected.

With the arrangement described above it has been found possible to amplify very accurately very small voltages without introducing any interfering signals. This arrangement is especially adapted to be used with high sensitivity amplifiers such as used in electroencephalographs and other medical instruments. The amplifier arrangement is adapted for use on the ordinary 50 or 60 cycle power circuit and there is no danger that voltage fluctuations in the line or alternating current hum or other spurious interference signals will affect the operation of the amplifier arrangement.

It will be understood that each of the elements described above, or two or more together, may also find a useful application in other types of amplifier arrangements differing from the types described above.

While the invention has been illustrated and described as embodied in a differential amplifier arrangement especially usable for electromedical purposes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within them meaning and range of equivalence of the following claims.

What is claimed as new and desired to be secured by Letters Patent is:

1. In a differential amplifier arrangement, in combination, a power transformer including a primary winding, a core and at least one secondary winding; shield means enclosing said primary winding; conductive means connecting said core and said shield means to a point of reference potential; shield means enclosing said secondary winding and isolated from said point of reference potential; and a conductive connection between said secondary winding and said shield means enclosing said secondary winding.

2. A power supply comprising, in combination, a power transformer including a primary winding, a core and at least one secondary winding; shield means enclosing said primary winding; conductive means connecting said core and said shield means to a point of reference potential; shield means enclosing said secondary winding and isolated from said point of reference potential; and a conductive connection between said secondary winding and said shield means enclosing said secondary winding.

3. A power supply comprising, in combination, a power transformer including a primary winding, a core and at least one secondary winding; circuit means including rectifier means connected with said secondary winding; shield means enclosing said primary winding; conductive means connecting said core and said shield means to electrical ground; shield means enclosing said secondary winding and said circuit means including said rectifier means, and being isolated from said electrical ground; and a conductive connection between the center point of said secondary winding and said shield means enclosing said secondary winding.

4. A power supply comprising, in combination, a power transformer including a primary winding, a core, a plate supply secondary winding and a filament supply secondary winding; shield means enclosing said primary winding; conductive means connecting said core and said shield means to a point of reference potential; shield means enclosing said plate supply secondary winding and said filament supply secondary winding and isolated from said point of reference potential; a conductive connection between the center point of said plate supply secondary winding and said shield means enclosing said secondary winding; a second conductive connection between said filament supply secondary winding and said shield means enclosing said secondary winding; and a pair of rectifier means respectively in circuit with said plate supply secondary winding and said filament supply secondary winding.

5. A power supply as set forth in claim 4 wherein said shield means enclosing said secondary winding comprises a housing member formed with a narrow slot therein extending from one end of said housing to the other end of said housing so as to prevent said housing from forming a short circuited loop, and further including a potentiometer having at least two fixed terminals and one movable terminal, conductive means connecting said fixed terminals to said housing at opposite edge portions of said slot, and conductive means connecting said movable terminal of said potentiometer to said center point of said plate supply secondary winding.

6. A power supply arrangement comprising, in combination, a potentiometer having two fixed terminals and one movable terminal; a glow discharge stabilizing device having a pair of terminals, one of said terminals of said stabilizing device being connected to one of said fixed terminals of said potentiometer; a source of alternating current connected between the other of said fixed terminals of said potentiometer and the other of said terminals of said stabilizing device, said alternating current having a value sufficient to ignite said stabilizing device at the peaks thereof, whereby a voltage is developed across said stabilizing device which has a constant peak value; a power transformer including a primary winding, a core and at least one secondary winding, one end of said primary winding being connected to said one terminal of said stabilizing device; a regulating transformer havng a primary winding and a secondary winding, said primary winding of said regulating transformer being connected between said movable terminal of said potentiometer and said one terminal of said stabilizing device, and said secondary winding of said regulating transformer being connected between said other terminal of said stabilizing device and the other end of said primary winding of said power transformer; and a load connected across said secondary winding of said power transformer.

7. A power supply arrangement comprising, in combination, a potentiometer having two fixed terminals and one movable terminal; a glow discharge stabilizing device having a pair of terminals, one of said terminals of said stabilizing device being connected to one of said fixed terminals of said potentiometer; a source of alternating current connected between the other of said fixed terminals of said potentiometer and the other of said terminals of said stabilizing device, said alternating current having a value sufficient to ignite said stabilizing device at the peaks thereof, whereby a voltage is developed across said stabilizing device which has a constant peak value; a power transformer including a primary winding, a core and at least one secondary winding, one end of said primary winding being connected to said one terminal of said stabilizing device; a regulating transformer having a primary winding and a secondary winding, said primary winding of said regulating transformer being connected between said movable terminal of said potentiometer and said one terminal of said stabilizing device, and said secondary winding of said regulating transformer being connected between said other terminal of said stabilizing device and the other end of said primary winding of said power transformer; and rectifier means including a storage capacitor of large size electrically connected to said secondary winding of said power transformer.

References Cited in the file of this patent

UNITED STATES PATENTS

| | | |
|---|---|---|
| 1,720,352 | Schmierer | July 9, 1929 |
| 2,141,654 | Kott | Dec. 27, 1938 |
| 2,259,070 | Krochmann | Oct. 14, 1941 |
| 2,409,033 | Garceau | Oct. 8, 1946 |
| 2,527,406 | Donker | Oct. 24, 1950 |
| 2,564,279 | Reynolds | Aug. 14, 1951 |
| 2,566,969 | Sorensen | Sept. 4, 1951 |
| 2,631,201 | Morrison | Mar. 10, 1953 |
| 2,677,729 | Mayne | May 4, 1954 |